United States Patent [19]

Gaus

[11] 4,395,925
[45] Aug. 2, 1983

[54] PLANETARY GEAR CHANGE-SPEED TRANSMISSION

[75] Inventor: Hermann Gaus, Stuttgart, Fed. Rep. of Germany

[73] Assignee: Daimler-Benz Aktiengesellschaft, Fed. Rep. of Germany

[21] Appl. No.: 187,138

[22] Filed: Sep. 15, 1980

[30] Foreign Application Priority Data

Sep. 13, 1979 [DE] Fed. Rep. of Germany ....... 2936969

[51] Int. Cl.$^3$ ............................................. F16H 57/10
[52] U.S. Cl. ........................................ 74/763; 74/762; 74/766; 74/770
[58] Field of Search ................. 74/762, 763, 766, 767, 74/770

[56] References Cited

U.S. PATENT DOCUMENTS

| | | | |
|---|---|---|---|
| 2,748,622 | 6/1956 | Syrovy et al. | 74/763 |
| 2,813,437 | 11/1957 | Kelbel et al. | 74/767 |
| 2,865,230 | 12/1958 | Simpson | 74/770 |
| 2,873,625 | 2/1959 | Simpson | 74/767 |
| 3,483,771 | 12/1969 | Forster et al. | 74/763 |
| 3,486,399 | 12/1969 | Forster | 74/763 |
| 3,797,332 | 3/1974 | Cameron et al. | 74/763 |
| 3,812,739 | 5/1974 | Mori et al. | 74/763 |
| 3,913,415 | 10/1975 | Herr | 74/767 |
| 4,089,238 | 5/1978 | Forster et al. | 74/763 |
| 4,184,386 | 1/1980 | Forster | 74/763 |
| 4,228,697 | 10/1980 | Miller | 74/762 |
| 4,315,443 | 2/1982 | Kubo et al. | 74/762 |

FOREIGN PATENT DOCUMENTS

| | | |
|---|---|---|
| 1555207 | 1/1971 | Fed. Rep. of Germany . |
| 2053321 | 5/1972 | Fed. Rep. of Germany ........ 74/762 |
| 2521832 | 11/1976 | Fed. Rep. of Germany . |
| 2013612 | 12/1977 | Fed. Rep. of Germany . |

Primary Examiner—Leslie A. Braun
Assistant Examiner—Joseph M. Rolnicki
Attorney, Agent, or Firm—Craig & Burns

[57] ABSTRACT

A planetary gear change-speed transmission for vehicles, in which a torque transmission train is operable to be drivingly connected by way of an input transmission with an input shaft, and by way of a main transmission, with an output shaft; the input transmission is operable to be shifted into direct speed ratio by a clutch and into a reduced speed ratio by braking a rotatable member by means of a brake; the main transmission includes a planetary gear reversing transmission which, by braking a rotatable member thereof, causes two other rotatable members to rotate in mutually opposite directions of rotation, whereby one of these two rotatable members is drivingly connected with the output shaft and the other of these two rotatable members is adapted to be drivingly connected, by way of a reverse speed clutch, with the torque transmission train; the rotatable member of the input transmission which can be braked, is operable to be drivingly connected with one of the two rotatable members of the reversing transmission, not in driving connection with the output shaft, while the clutch and brake of the input transmission as well as the reverse speed clutch are disengaged.

15 Claims, 2 Drawing Figures

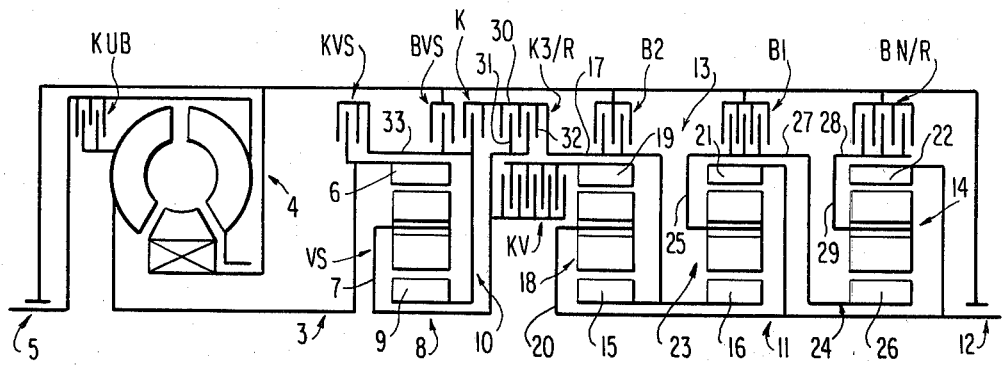

PLANETARY GEAR CHANGE-SPEED TRANSMISSION

The present invention relates to a change-speed transmission and, more particularly, to a planetary gear change-speed transmission for vehicles, in which a torque transmission train is adapted to be drivingly connected by way of an input transmission with an input shaft driveable by a driving engine, on the one hand, and by way of a main transmission with an output shaft which may be coupled to the vehicle wheels; on the other, and in which the input transmission may be shifted by a gear shift brake into a direct speed ratio and by braking a transmission member by means of a gear shift brake into a reduced speed ratio, and in which the main transmission includes a planetary gear reversing transmission in which, by fixedly braking a transmission member, two other transmission members rotate in mutually opposite directions of rotation, with one of these two other transmission members being in driving connection with the output shaft and the other of these two other transmission members being adapted to be drivingly connected by means of a reverse speed clutch with the torque transmission train.

In conventional change-speed transmissions such as disclosed for example, in German Auslegeschrift 2,013,612, the main transmission consists of a Simpson planetary gear transmission with a direct gear step and two reduced gear steps so that six forward speeds or gears are obtained by multiplication with the two gear steps of the input transmission constructed as a one-web planetary gear transmission.

In another change-speed transmission of the aforementioned type disclosed, for example, in German Offenlungsschrift 2,521,832, the main transmission also includes a Simpson set which, however, is coupled twice with a third one-web planetary gear transmission in such a manner that the gear member from the third planetary gear transmission is connected to the output shaft, a second gear member is connected to a gear member of the Simpson set not connected to the output shaft, and the third gear member is adapted to be held fast by braking. In this manner, the main transmission includes a direct speed and three reduced speeds so that eight forward speeds result by multiplication with the two speeds of the input transmission constructed as a one-web planetary gear transmission.

With such types of change-speed transmissions, a high number of speeds is advantageous in order to be able to provide small transmission ratio jumps with a given high overall transmission ratio, for example, of 1:8, while maintaining a progressive speed variation in the range of the upper gears or speeds because the fuel consumption can be maintained thereby relatively low.

Moreover, the higher transmission ratio jumps resulting in such a construction within the range of the middle speeds, in turn, have a favorable effect in the sense of a high transport velocity or average speed of the vehicle when the transmission is shifted up.

However, since in such a change-speed transmission the input transmission has only one reduced speed, the main transmission, in order to obtain a large number of gears or speeds, must have a large number of planetary gears.

The aim underlying the present invention essentially resides in connection with change-speed transmissions of the aforementioned type having a specific number of speeds, in weakening or reducing the progression of the gear speed intervals or transmission ratio jumps in the range of the upper gears without changing the number of gears of the main transmission.

The underlying problems are solved in accordance with the present invention in that the rotatable member of the input transmission which is adapted to be braked is operable to be drivingly connected by way of a second torque transmission train with the one of the two mutually oppositely rotatable members of the reversing gear which is not connected with the output shaft while the gear shift clutch and gear shift brake of the input transmission as also the reverse speed clutch are disengaged.

In the change-speed transmission of the present invention, the input transmission may operate with an additional second reduced gear speed having power branching on the reversing gear of the main transmission, whereby the additional torque transmission train connected to the brakeable gear member of the input transmission has a negative sense of rotation due to its coupling with the reversing gear, whence this additional gear speed naturally has a greater speed reduction than the other reduced gear speed formed by braking the respective gear member. In this manner, it is possible to employ, for gear staggering of lower gears, the more greatly reduced gear step of the input transmission so that the progression of the transmission speed intervals or transmission ratio jumps is in increased within the range of the lower gears and, consequently, may be reduced, as desired, in the range of the upper gears without requiring a change in the overall transmission ratio for the lowermost gear or in the number of gears for the main transmission.

With the change-speed transmission according to the present invention, it is not absolutely necessary that the main transmission be constructed as a Simpson set. Instead it is possible to use all coupling transmissions for use as the main transmission such as, for example, a coupling transmission disclosed in German Offenlungungsschrift 1,555,207, in which a second torque transmission train may be brought into driving connection with a reversing gear required for the reverse speed.

With the change-speed transmission of the present invention, the second torque transmission train may be brought into a driving connection with the reversing gear by way of a free-wheeling device or one-way clutch.

In order to advantageously transmit braking moments, in accordance with further features of the present invention, the second torque transmission train may be provided with a forward speed clutch.

In order to obtain eight or more forward speeds in the change-speed transmission in accordance with the present invention, the second torque transmission train may be drivingly connected with a transmission member such as, for example, a sun gear of an additional transmission, in which a second transmission member such as, for example, a ring gear is in driving connection with the output shaft and a third transmission member such as a planetary gear carrier is operable to be braked and to be drivingly connected with the one transmission member, for example, a sun gear, not in a driving connection with the output shaft, of the two transmission members of the reversing transmission which rotate in mutually opposite directions of rotation.

In the change-speed transmission of the present invention with at least eight forward gears, the additional gear speed of the input transmission offers a particularly great speed reduction ratio by braking a transmission member such as the planetary gear carrier of the additional transmission, by means of which two other transmission members such as a sun gear and a ring gear may be caused to rotate in mutually opposite directions of rotation. Moreover, it is advantageous if the ring gear of the additional transmission is connected to the output shaft.

In order to obtain a suitable and advantageous coupling of the second torque transmission train to the main transmission, advantageously the second torque transmission train is operable to be connected with a driving drum which extends over a clutch half of the reverse speed clutch pertaining to the other torque transmission train and is operatively connected to the one transmission member of the two transmission members rotating in opposite directions of the reversing transmission, which is not in driving connection with the output shaft.

In order to obtain an advantageous construction of a reverse gear clutch in conjunction with the coupling of the second torque transmission train in the change-speed transmission of the present invention, the driving drum which may be connected to the second torque transmission train includes the other clutch half of the reverse speed clutch pertaining to the reversing transmission.

In order to obtain an advantageous construction for the change-speed transmission of the present invention, the forward speed clutch of the second torque transmission train may be arranged spatially between the gear shift brake of the input transmission and the reverse speed clutch.

Accordingly, it is an object of the present invention to provide a planetary gear change-speed transmission with an input and a main transmission for motor vehicles which avoids, by simple means, the aforementioned shortcomings and disadvantages encountered in the prior art.

Another object of the present invention resides in providing a planetary gear change-speed transmission with an input and a main transmission for motor vehicles which minimizes the number of planetary gears in the main transmission.

Still another object of the present invention resides in providing a planetary gear change-speed transmission with input and main transmission which provides a reduced gear ratio in an associated input transmission in a transmission having at least eight forward speeds.

A still further object of the present invention resides in providing a planetary gear change-speed transmission which has an overall simplified structural design.

These and other objects, features, and advantages of the present invention will become more apparent from the following description when taken in connection with the accompanying drawing which shows, for the purposes of illustration only, one embodiment in accordance with the present invention, and wherein:

FIG. 1 is a schematic view of a change-speed transmission in accordance with the present invention; and FIG. 2 is a shifting diagram for gear shifting members of the change-speed transmission of FIG. 1.

Referring now to the drawing wherein like reference characters are used in both views to designate like parts and, more particularly, to FIG. 1, according to this Figure, an input shaft generally designated by reference numeral 3 is adapted to be driven by way of hydrodynamic torque converter generally designated by reference numeral 4 or by way of a bridging clutch generally designated by reference character KUB by the main shaft generall designated by the reference numeral 5 of a driving engine (not shown). The input shaft 3 is connected to a ring gear 6 of an input transmission generally designated by the reference character VS. The input transmission VS may be connected through a first torque transmission train generally designated by reference numeral 8 starting from the planetary gear carrier 7 thereof and through a second torque transmission train generally designated by the reference numeral 10 starting from the sun gear 9 thereof to a main transmission generally designated by the reference numeral 11. The main transmission 11 is adapted to act upon or drive an output shaft generally designated by the reference numeral 12 which is adapted to be coupled, in a conventional manner, to wheels of a motor vehicle (not shown).

The main transmission 11 consists of a Simpson set generally designated by the reference numeral 13 and of a one-web planetary gear reversing transmission generally designated by the reference numeral 14. The coupling shaft of sun gears 15 and 16 of the Simpson set 13 is connected to a driving drum 17 which extends over the forward planetary gear generally designated by reference numeral 18 of the Simpson set 13 and is adapted to be braked by a gear shift brake generally designated by reference character $B_2$ or is adapted to be connected by a reverse gear clutch generally designated by reference character $K_{3/R}$ with the torque transmission train 8.

The torque transmission train 8 is connected through a forward speed clutch generally designated by reference character KV to a ring gear 19 of the forward planetary gear 18, whose planetary gear carrier 20 is connected to the output shaft 12. The output shaft 12 is additionally connected to the ring gears 21 and 22 of the rear planetary gear generally designated by reference numeral 23 of the Simpson set 13 and of the reversing gear transmission 14.

A second coupling between the Simpson set 13 and the reversing gear transmission 14 is established by a torque transmission train generally designated by the reference numeral 24, which connects the planetary gear carrier 25 of the transmission 23 with the sun gear 26 of the reversing gear transmission 14, and includes a driving drum 27, on which acts a gear shift brake generally designated by reference character $B_1$. Further driving drum 28, which may be braked by a gear shift brake generally designated by reference character $B_{N/R}$ is connected to the planetary gear carrier 29 of the reversing gear transmission 14.

The torque transmission train 10 includes a driving drum 33 connected to the sun gear 9 which drum 33 is adapted to be braked by a gear shift brake generally designated by the reference character $B_{VS}$ and which is adapted to be connected by way of gear shift clutches generally designated by reference characters $K_{VS}$ and K to the ring gear 6 or to a driving drum 30. The driving drum 30 extends over the clutch half 31 of the reverse speed clutch generally designated by reference character $K_{3/R}$ belonging to the input transmission VS and is connected to the driving drum 17 of the sun gears 15 and 16.

As shown in FIG. 2, in the neutral position O of the transmission control device (not shown), of the gear shift members only the gear shift clutch K and forward speed clutch $K_V$ are engaged so that the possible reaction members 15, 16 and planetary gear carriers 25 respectively 29 of the main transmission 11 are inactivated, i.e., are permitted to rotate freely so that the torque transmission to the output shaft 12 is interrupted.

In first gear, initially only the gear shift brake $B_{N/R}$ of the main transmission 11 is additionally engaged so that the input shaft 3 is driven during starting through the converter 4 and, after reaching the clutching point, by way of the bridging clutch KUB which is then engaged. The torque is then divided in the input transmission VS into a positive torque proportion of the torque transmission train 8 and into a negative torque proportion proportion of the torque transmission train 10. Since the planetary gear carrier 29 is braked, the torque transmission train 24 and therewith the sun gears 15 and 16 together with the torque transmission train 10 as well as the sun gear 9 exhibit a negative direction of rotation, whence the input transmission VS provides a lower transmission ratio in this gear speed than in the gear speed with a braked sun gear 9.

In second gear, the gear shift clutch KVS is engaged in place of the gear shift clutch K, whereby the input shaft 3 drives the ring gear 19 without reduction by way of the input transmission VS which now rotates as a block to provide for a direct gear speed. The sun gears 15 and 16 act as the reaction member on the torque transmission train 24 in a negative sense of rotation, which as in first gear, drives by way of the braked planetary gear carrier 29, the ring gear 22 and thereby, together with the planetary gear carrier 20, the output shaft 12 in a positive direction of rotation.

With the change-speed transmission in third gear, the gear shift clutch K is engaged instead of the gear shift clutch $K_{VS}$, and the gear shift brake $B_1$ is actuated instead of the gear shift brake $B_{N/R}$. As a result thereof, the reversing gear 14 is disengaged or rendered ineffectual and the torque of the input shaft 3 is then subdivided in the input transmission VS as in first gear, between the two torque transmission trains 8 and 10, whereby the output shaft 12 is now driven by way of the ring gear 21 by the sun gears 15 and 16 which now also rotate in a negative direction of rotation, as well as by the planetary gear carrier 20, in a positive direction of rotation.

In fourth gear, the gear shift clutch $K_{VS}$ is again engaged instead of the gear shift clutch K, whereby the transmission ratio is obtained solely from the lowest gear speed of the Simpson gear set 13.

In fifth gear, the gear shift brakes $B_{VS}$ and $B_2$ are engaged in place of the gear shift clutch $K_{VS}$ and the gear shift brake $B_1$ whereby the rear planetary gear 23 of the Simpson set 13 is effectively disconnected or rendered ineffectual and the input transmission VS is shifted into its higher one of its two reduced gear speeds, in which the sun gear 9 is fixedly braked. Of the main transmission 11, only the planetary gear carrier 20 now acts on the output shaft 12 at this point.

In sixth gear, the gear shift clutch $K_{VS}$ is engaged in place of the gear shift brake $B_{VS}$, whereby the transmission ratio results alone from the speed reduction gear step of the forward planetary gear 18 of the Simpson set 13.

In seventh gear, the gear shift brake $B_{VS}$ and reverse speed clutch $K_{3/R}$ are engaged in place of the gear shift clutch $K_{VS}$ and the gear shift brake $B_2$, whereby the entire main transmission 11 rotates as a block so as to provide a direct gear speed, and the transmission ratio results alone from the higher one of the two reduced gear speeds of the input transmission VS.

Finally in eighth gear, the input transmission VS is shifted into its direct gear speed by the engaged gear shift clutch $K_{VS}$ and as a result thereof the input shaft 3 is coupled to the output shaft 12.

In reverse gear, the gear shift brakes $B_{VS}$ and $B_{N/R}$ as well as the reverse speed clutch $K_{3/R}$ are engaged whereby the input transmission VS is shifted into the higher one of its two reduced gear speeds and the forward planetary gear 18 of the Simpson set 13 is effectively disconnected or rendered ineffectual. The sun gear 16 is driven in a positive direction of rotation by the torque transmission train 8, whereby also the torque transmission train 24 rotates in a positive direction of rotation. Due to the fixedly braked planetary gear carrier 29, the ring gear 22 and therewith the output shaft 12 is driven in a negative direction of rotation.

While I have shown and described only one embodiment in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A planetary gear change-speed transmission for a motor vehicle, comprising an input shaft operable to be driven by an engine of the motor vehicle, an output shaft operable to be coupled to wheels of the motor vehicle, a main transmission means, an input transmission means having several rotatable transmission members, first torque-transmitting train means operable to be drivingly connected by way of said input transmission means with said input shaft and by way of said main transmission means with said output shaft, first engageable means for shifting the input transmission means into a direct speed ratio, second engageable means for braking a transmission member of the input transmission means to shift the latter into a reduced speed ratio, said main transmission means including gear set means having several rotatable members and a planetary gear reversing transmission means having several rotatable members, two transmission members of said reversing transmission means being operable to be rotated in mutually opposite directions of rotation by braking a further transmission member thereof by a third engageable means, one of said two transmission members of said planetary gear reversing transmission means being in driving connection with the output shaft while the other of said two transmission members of said planetary gear reversing transmission means is operable to be drivingly connected with the first torque-transmitting train means by a fourth engageable means forming a reverse speed clutch means, characterized in that the transmission member of the input transmission means which is operable to be braked by said second engageable means is operable to be drivingly connected with the other of said two transmission members of said planetary gear reversing transmission means by way of a second torque-transmitting train means providing with said first, second and fourth engageable means disengaged, a driving connection between said last-mentioned transmission member of said input transmission means and the main transmission means which is different from the driving connection between said input transmission means and said main transmission provided by said first torque-transmitting train means.

2. A change-speed transmission according to claim 1, characterized in that the first and second engageable means are respectively formed as a gear shift clutch means and a gear shift brake means.

3. A change-speed transmission according to claim 1, characterized in that the first and second torque-transmitting train means include each a separate engageable means operable to selectively connect different rotatable members of said input transmission means with said output shaft by way of different rotatable members of said main transmission means.

4. A change-speed transmission according to claim 3, characterized in that the main transmission means further includes a rear planetary gear means having a first, a second and a third rotatable member, the second torque transmitting train means being operable to be positively drivingly connected with one of the rotatable members of the planetary gear means, a second of the rotatable members of the rear planetary gear means being operable to be drivingly connected with the output shaft, and a third of the rotatable members of the rear planetary gear means being operable to be drivingly connected with the rotatable member of the reversing transmission means not in driving connection with the output shaft, and in that engageable means are provided for braking the rotatable member of the rear planetary gear means which is operable to be drivingly connected with the rotatable member of the reversing transmission means not in driving connection with the output shaft.

5. A change-speed transmission according to claim 4, characterized in that the rotatable member of the rear planetary gear means is operable to be braked, by means of which two other rotatable members of the gear planetary gear means are operable to be brought into mutually opposed directions of rotation.

6. A change-speed transmission according to claim 5, characterized in that the transmission member of the rear planetary gear means operable to be drivingly connected with the output shaft is a ring gear.

7. A change-speed transmission according to claim 6, characterized in that the second torque-transmitting train means is operable to be drivingly connected with a driving drum which extends over a first clutch half of the third engageable means and is operatively connected with the rotatable member of the reversing transmission means not in driving connection with the output shaft.

8. A change-speed transmission according to claim 7, characterized in that said driving drum includes the other half of the third engageable means.

9. A change-speed transmission according to claim 8, characterized in that the engageable means of the second torque-transmitting train means is spatially arranged between the second engageable means and the third engageable means.

10. A change-speed transmission according to claim 4, characterized in that the rotatable member of the rear planetary gear means operable to be drivingly connected with the second torque-transmitting train means is a sun gear, the rotatable member of the rear planetary gear means operable to be drivingly connected with the output shaft is a ring gear, and in that the rotatable member of the rear planetary gear means operable to be drivingly connected with the rotatable member of the reversing transmission means forming its input member is a planetary gear carrier means.

11. A change-speed transmission according to claim 10, characterized in that the rotatable member of the reversing transmission means operable to be drivingly connected with the output shaft is a ring gear and in that the rotatable member of the reversing transmission means not in driving connection with the output shaft which forms the input member thereof is a sun gear.

12. A planetary gear change-speed transmission for a motor vehicle, comprising an input shaft operable to be driven by an engine of the motor vehicle, an output shaft operable to be coupled to wheels of the motor vehicle, a main transmission means, an input transmission means having several rotatable transmission members, first torque-transmitting train means operable to be drivingly connected by way of said input transmission means with said input shaft and by way of said main transmission means with said output shaft, first engageable means for shifting the input transmission means into a direct speed ratio, second engageable means for braking a transmission member of the input transmission means to shift the latter into a reduced speed ratio, said main transmission means including gear set means having several rotatable members and a planetary gear reversing transmission means having several rotatable members, two transmission members of said reversing transmission means being operable to be rotated in mutually opposite directions of rotation by braking a further transmission member thereof by a third engageable means, one of said two transmission members of said planetary gear reversing transmission means being in driving connection with the output shaft while the other of said two transmission members of said planetary gear reversing transmission means is operable to be drivingly connected with the first torque-transmitting train means by a fourth engageable means forming a reverse speed clutch means, characterized in that said first torque-transmitting train means includes a first output shaft of said input transmission means, and in that a second output shaft of said input transmission means is operable to be positively connected with said input shaft by way of said input transmission means and with said output shaft by way of said main transmission means, the second output shaft of said input transmission means being operable to be drivingly connected with the other of said two transmission members of said planetary gear reversing transmission means with said first, second and fourth engageable means disengaged.

13. A planetary gear change-speed transmission, comprising an input shaft, a transmission output shaft, input transmission means including several rotatable elements, first engageable means to provide a direct drive through said input transmission means, second engageable means operable to brake one of the rotatable members of said input transmission means to provide a reduced speed ratio by said input transmission means, main transmission means including gear set means having several rotatable members to provide several transmission ratios and a planetary gear reversing transmission means having several rotatable members, two rotatable members of said reversing transmission means being operable to be rotated in mutually opposite directions of rotation by engagement of a third engageable means acting on a third rotatable member of said reversing transmission means, one of said two rotatable members of said reversing transmission means being drivingly connected with the output shaft, a first torque-transmitting train means operatively connecting a second rotatable member of said input transmission means which forms an output member thereof, with the output shaft by way of fourth engageable means and said gear set means of the main transmission means, and second torque-transmitting train means operable to drivingly connect the one rotatable member of said input transmission means with said transmission output shaft including further means operable to connect said last-mentioned rotatable member of said input transmission means as a second output member thereof with a rotatable member of said gear set means.

14. A transmission according to claim 13, wherein said further means includes fifth engageable means positively connecting said one rotatable member of the input transmission means with the rotatable member of said gear set means.

15. A transmission according to claim 14, wherein said gear set means is a Simpson gear having two planetary gears sets whose sun gears are interconnected, the transmission output shaft being drivingly connected with the planet carrier of one of said two planetary gears sets and with the ring gear of the other planetary gear set, said fifth engageable means being operable to selectively connect the ring gear of said one planetary gear set, with the first-mentioned output member of said input transmission means, and the fourth engageable means being operable to selectively connect the interconnected sun gears with the second output member of said input transmission means.

* * * * *